United States Patent
Ohashi

(10) Patent No.: US 9,415,555 B2
(45) Date of Patent: Aug. 16, 2016

(54) MOLDING ELEMENT COMPRISING CUTTING MEANS FOR MOLDING AND VULCANIZING A TIRE TREAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Tetsuo Ohashi, Tokyo (JP)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/896,704

(22) PCT Filed: Jun. 6, 2014

(86) PCT No.: PCT/EP2014/061799
§ 371 (c)(1),
(2) Date: Dec. 8, 2015

(87) PCT Pub. No.: WO2014/198652
PCT Pub. Date: Dec. 18, 2014

(65) Prior Publication Data
US 2016/0129651 A1  May 12, 2016

(30) Foreign Application Priority Data

Jun. 14, 2013  (EP) .................... 13172035

(51) Int. Cl.
*B29D 30/06* (2006.01)
*B29D 30/68* (2006.01)

(52) U.S. Cl.
CPC ............ *B29D 30/0606* (2013.01); *B29D 30/68* (2013.01); *B29D 2030/0612* (2013.01); *B29D 2030/0613* (2013.01)

(58) Field of Classification Search
CPC ............... B29D 30/0606; B29D 30/68; B29D 2030/0612; B29D 2030/0613
See application file for complete search history.

(56) References Cited

U.S. PATENT DOCUMENTS 3,415,923 A * 12/1968 Petersen ............ B29D 30/0606
164/10
3,432,888 A   3/1969 Brierley
(Continued)

FOREIGN PATENT DOCUMENTS

GB        1124915 A      8/1968
WO   2006069912 A1      7/2006
(Continued)

OTHER PUBLICATIONS

International Search Report for Priority Application PCT/EP2014/061799 Dated Aug. 20, 2014.

*Primary Examiner* — James Mackey
(74) *Attorney, Agent, or Firm* — Dickinson Wright PLLC

(57) ABSTRACT

Molding element of a mold for molding and vulcanizing a tire tread, this tread having a tread surface intended to come into contact with the ground when the said tire is rolling. The molding element having a molding surface intended to mold part of the tire tread surface and a blade intended to mold a sipe or a groove in the tread. Indeed, the molding element has two cutting means positioned on either side of the blade at a certain distance from this blade, these cutting means having a plurality of pins.

3 Claims, 4 Drawing Sheets

(56) References Cited

U.S. PATENT DOCUMENTS

| | | | |
|---|---|---|---|
| 4,553,918 A | 11/1985 | Yoda et al. | |
| 9,126,377 B2* | 9/2015 | Duvernier | B29D 30/0606 |
| 9,149,995 B2* | 10/2015 | Duvernier | B29D 30/0606 |
| 9,186,820 B2* | 11/2015 | Perrin | B29D 30/0606 |
| 2008/0149260 A1* | 6/2008 | Orsat | B29C 45/0055 |
| | | | 156/128.6 |
| 2015/0000827 A1* | 1/2015 | Duvernier | B29D 30/66 |
| | | | 156/129 |
| 2015/0328934 A1* | 11/2015 | Kaneko | B60C 11/03 |
| | | | 425/363 |
| 2016/0121569 A1* | 5/2016 | Kaneko | B29D 30/0606 |
| | | | 264/163 |

FOREIGN PATENT DOCUMENTS

| | | |
|---|---|---|
| WO | 2013087826 A1 | 6/2013 |
| WO | 2013087829 A1 | 6/2013 |

* cited by examiner

MOLDING ELEMENT COMPRISING CUTTING MEANS FOR MOLDING AND VULCANIZING A TIRE TREAD

This application is a 371 national phase entry of PCT/EP2014/061799, filed 6 Jun. 2014, which claims benefit of European Patent Application No. 13172035.1, filed 14 Jun. 2013, the contents of which are incorporated herein by reference for all purposes.

BACKGROUND

The present disclosure relates to the field of molds for molding and vulcanizing a tire tread. More specifically, an embodiment of the invention relates to the molds used for molding in the tread grooves which are partially or completely covered by an additional cover layer.

DESCRIPTION OF RELATED ART

It is known practice to design tiretires the tread of which comprises various rubber compounds. Document WO 03089257 discloses such treads. More specifically, document WO 03089257 discloses a tread comprising grooves the walls of which are covered with a cover layer. The material of which this cover layer is made differs from the rubber compound of which the tread is made. This material notably has much better wet grip than the wet grip of the rubber compound. This allows a very significant improvement in cornering performance on wet ground.

One way of manufacturing this tread is notably disclosed in document WO 2006069912. According to this method of manufacture, in a first step, provision is made for the material intended to constitute a cover layer to be injected in the form of one or more inserts into the green tire using an injection nozzle. The insert or inserts is or are then shaped, in a second step, by ribs of a vulcanizing mold so that they cover all or part of the walls of the grooves molded by these ribs.

This method of manufacture has its limits, particularly as far as obtaining precision moldings is concerned. Specifically, during the shaping thereof, the insert experiences a significant shear force from the rib in order to convert this insert into a layer of lesser thickness. This shear force may cause cracking within the insert, making it more difficult to control the movements of the material of which this insert is made. The shape and the thickness of the cover layer thus formed may therefore be somewhat haphazard. The advantages afforded by the additional layer to the performance of the tire are then reduced.

In addition, in this method of manufacture, it is necessary to make the inserts align with the ribs. This makes manufacture of the tread more complicated.

There is therefore a need to improve the incorporation of a cover layer on the walls of grooves of a tire tread.

DEFINITIONS

A "tire" means all types of elastic tire whether or not subjected to an internal pressure.

A "green tire" or "green form" of a tire means a superposition of a plurality of semi-finished rubber products present in the form of strips or sheets, with or without reinforcement. The green tire is intended to be vulcanized in a mold in order to obtain the tire.

The "tread" of a tire means a quantity of rubber material bounded by lateral surfaces and by two main surfaces one of which is intended to come into contact with a road surface when the tire is running.

A "tread surface" means the surface formed by those points on the tire tread that come into contact with the road surface when the tire is running.

A "mold" means a collection of separate molding elements which, when brought closer towards one another, delimit a toroidal molding space.

A "molding element" of a mold means part of a mold. A molding element is, for example, a mold segment.

A "molding surface" of a molding element means the surface of the mold that is intended to mold the surface of the tire tread.

A "blade" of a molding element means a protrusion projecting from the molding surface. In the blades category, a distinction is made between sipe blades which are less than 2 mm wide and ribs which have a width of 2 mm or more. Sipe blades are intended to mold sipes in the tire tread, which means cuts which at least partially close up when they fall within the contact patch where the tire makes contact with the ground. The ribs are intended to mold grooves in the tread, which means cuts which do not close up when they fall within the contact patch in which the tire makes contact with the ground.

SUMMARY

The invention, in an embodiment, relates to a molding element of a mold for molding and vulcanizing a tire tread, this tread comprising a tread surface intended to come into contact with the ground when the said tire is rolling. The molding element comprises a molding surface intended to mold part of the tire tread surface and a blade intended to mold a sipe or a groove in the tread. The molding element comprises two cutting means positioned on either side of the blade at a certain distance from this blade, these cutting means comprising a plurality of pins.

The cutting means are able to cut a cover layer that covers a green tire. The blade itself will mold a cut in the tread and at the same time guide part of the cover layer into the cut thus molded.

The invention, in an embodiment, thus proposes that the cover layer is cut and some parts of this layer are positioned within the depth of the green tire during one and the same movement of the molding element with respect to the green tire.

The cutting means can create a stress concentration at cutting means connection area. That stress causes block chipping during tire rolling and crack initiation risk in the depth of the tread band. By using a plurality of pins as cutting means, opening stress for cuts molded by pins is not directly applied to the rubber edge. Consequently, the crack initiation risk and the block shipping during tire rolling are reduced.

In an alternative form of the embodiment, the pins are aligned in a row along a direction of extension X. These pins comprise a body and a lamella on the top of this body, this lamella being aligned to this direction of extension X.

It is important that the cover layer crack initiated by one pin is connected to other cracks initiated by the other pins next to them. To make the cracks propagate in the proper direction, it is proposed to put lamella on the top of the pins and the directions of these lamella are aligned to the row of the pins.

In an another alternative form, all or parts of the pins comprises a sharp edge. This sharp edge improves the operation of cutting the cover layer.

BRIEF DESCRIPTION OF THE DRAWINGS

Other features and advantages of the embodiments of the invention will emerge from the following description, given by way of non-limiting example, with reference to the attached drawings in which.

DETAILED DESCRIPTION OF SPECIFIC EMBODIMENTS

In the description that follows, elements that are substantially identical or similar will be denoted by identical references.

Figure 1:
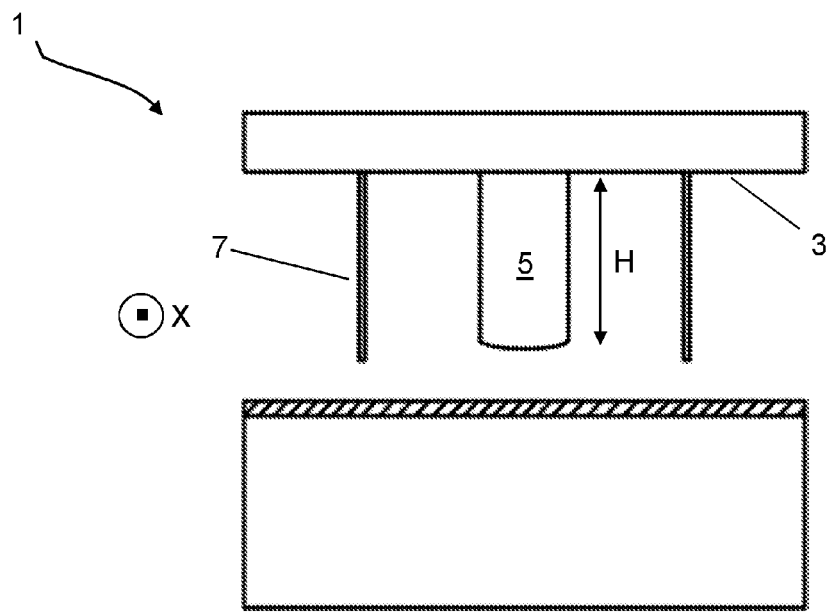
FIG. 1 is a sectional drawing depicting schematically a molding element according to an embodiment of the invention.

FIG. 1 depicts a molding element 1 for implementing a method of manufacture according to the embodiment of the invention.

More specifically, the molding element 1 comprises a molding surface 3 intended to mold part of the tread surface of a tire. The molding element 1 also comprises blades 5 of which just one is depicted here to make the embodiment of the invention easier to understand. The blade in this instance is a rib 5 intended to mold a groove in the tire tread. A "groove" in a tread means a cut in this tread of a width, i.e. the distance separating two lateral walls of this groove, greater than 2 mm. The rib 5 extends heightwise and projects from this molding surface 3 with an height H. The rib 5 also extends lengthwise in a direction of extension X. In the mold, this direction X may be a circumferential direction following the circumference of the mold. As an alternative, the direction of extension X is a transverse direction perpendicular to the circumferential direction of the mold. In another alternative form, this direction of extension is an oblique direction making a non-zero angle with the circumferential direction and with the transverse direction of the mold.

The molding element 1 of FIG. 1 also has two cutting means 7 arranged either side of the rib 5. These cutting means extend lengthwise in a direction parallel to the direction of extension X of the rib 5. A "parallel direction" means that the direction of extension of the cutting means makes an angle of between −5° and +5° with the direction of extension X of the rib.

The height of the cutting means is, here, higher than the height H of the rib 5. In another embodiments, the height of the cutting means is equal or lower than the height H of this rib 5.

Figure 2:
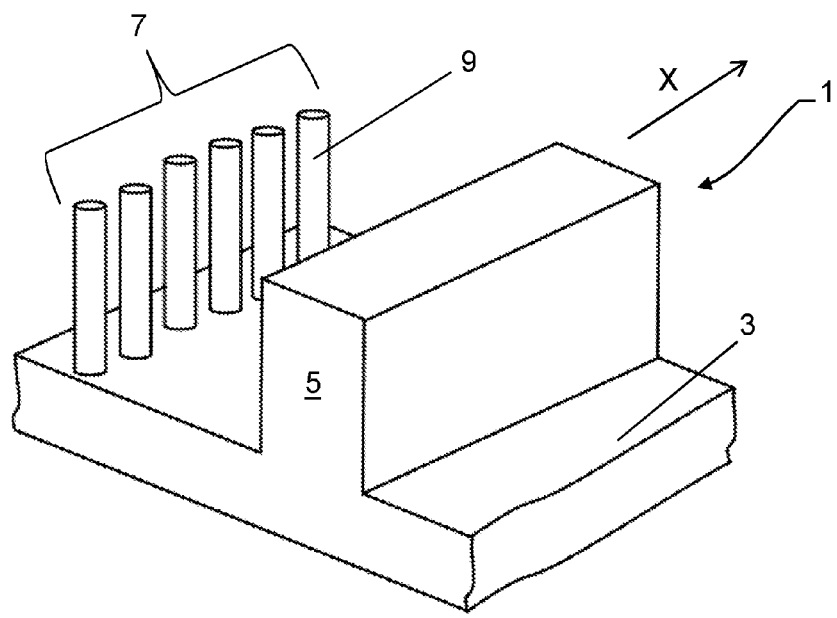
FIG. 2 illustrates cutting means of the molding element of FIG. 1 comprising a plurality of pins, according to a first embodiment of the invention.

FIG. 2 illustrates cutting means 7 comprising a plurality of pins 9. These pins are aligned to the direction of extension X of the blade 5.

Figure 3:
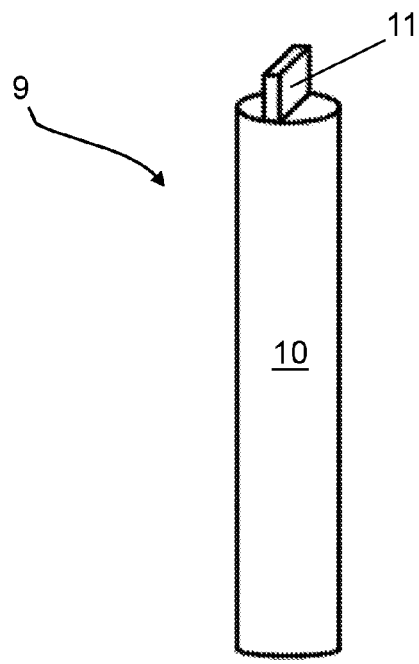
FIG. 3 illustrates a pin of the molding element of FIG. 1, according to a second embodiment of the invention.

FIG. 3 illustrates another embodiment of pins 9. The pin comprises a body 10 and a lamella 11 on the top of this body. In a preferred form, the pins are placed in the mold 1 in such a way that all the lamella are aligned to the direction of extension X.

Figure 4:
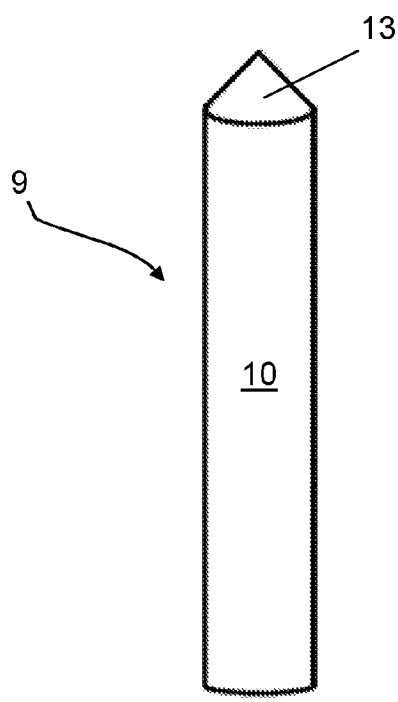
FIG. 4 illustrates a pin of the molding element of FIG. 1, according to a third embodiment of the invention.

FIG. 4 illustrates another embodiment of pins 9 in which the pin comprises a sharp edge 13 on the top of the body 10.

Of course, it is possible to propose a pin combining the lamella of FIG. 3 with the sharp edge of FIG. 4.

FIG. 5 to FIG. 8 illustrates the different steps of a method of manufacturing a tire tread using a molding element according to the embodiment of the invention.

Figure 5:
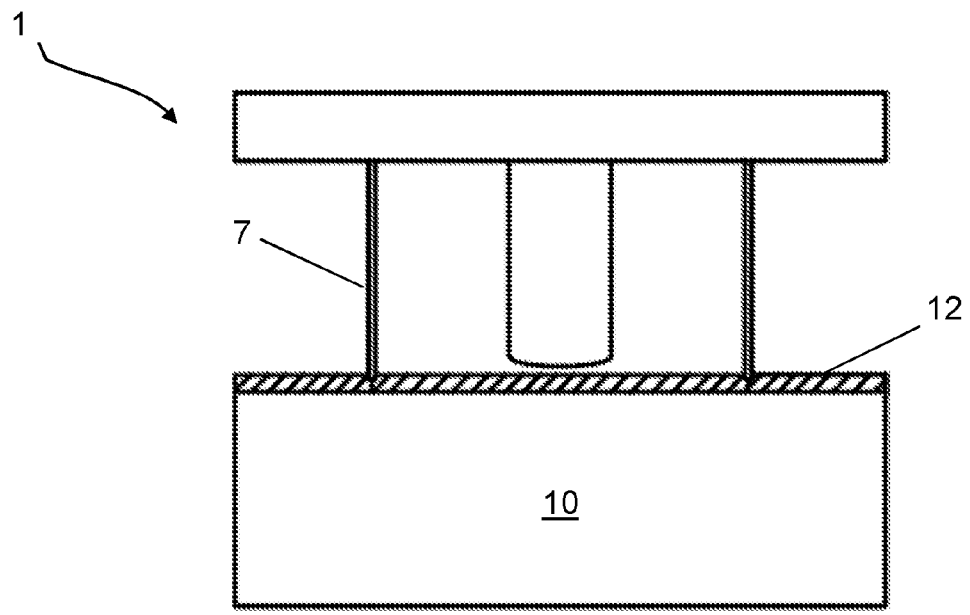
FIG. 5 illustrates a step of the method of manufacturing using the molding element of FIG. 1, in which the cover layer is cut by the pins.

FIG. 5 discloses a step in which the cover layer 12 is cut by the cutting means 7. In this step, the molding element 1 and the green tire 10 move closer to one another. This movement is, for example, initiated by a membrane (not depicted) in the mold. Under the action of a quantity of pressurized steam, this membrane swells and pushes the green tire towards the molding element 1.

Figure 6:
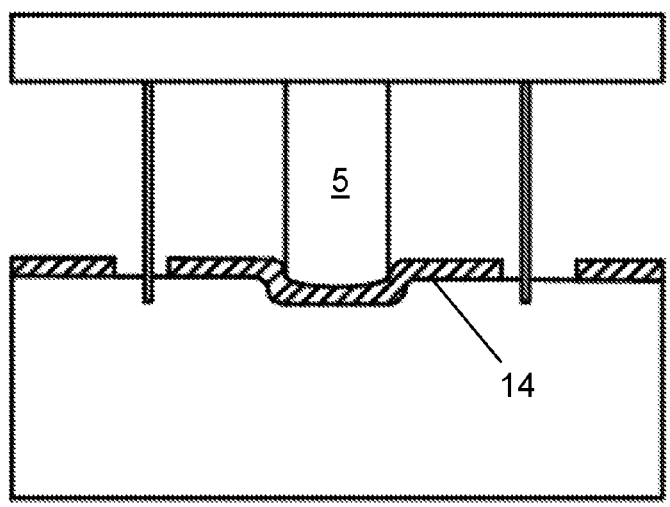
FIG. 6 illustrates a step of the method of manufacturing using the molding element of FIG. 1, in which the blade drives a cut part of the cover layer into the green tire.

FIG. 6 illustrates a step whereby the blade 5 drives part 14 of the cover layer into the green tire.

Figure 7:
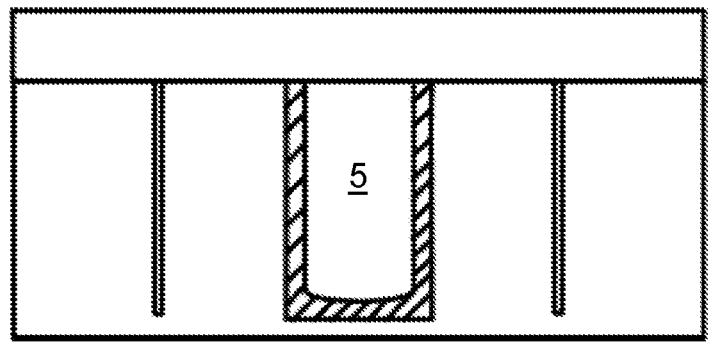
FIG. 7 illustrates a step of the method of manufacturing using the molding element of FIG. 1, in which blade and lamella are totally embedded in the green tire.

FIG. 7 illustrates an intermediate molding step in which the rib 5 is pushed into the green tire over its entire height. The entirety of the cover layer thus finds itself inside the green tire. Once this step has been performed, it is then possible to vulcanize the green tire, i.e. to convert the rubber material of which the green tire is made from the plastic state to the elastic state. This vulcanizing step may also modify the internal structure of the cover layer.

Figure 8:
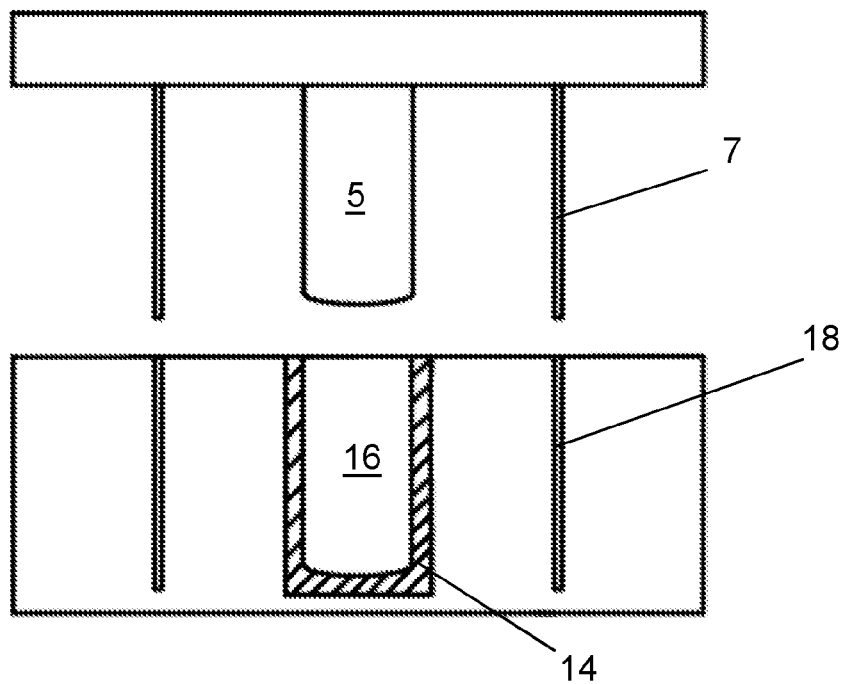
FIG. 8 is a sectional drawing depicting schematically a tire tread with a raised element partially covered by a cover layer, after using the molding element of FIG. 1.

FIG. 8 depicts the result of the various steps of molding and vulcanizing the green tire illustrated in FIG. 5 to FIG. 7. The part of the tread thus obtained comprises a groove 16 obtained by molding rubber around the rib 5 and two sipes 18 obtained by molding rubber around the two cutting means 7. It will be noted here that all of the walls of the groove, i.e. the lateral walls and the bottom wall flanked by the lateral walls, are covered with the cut part 14 of the cover layer.

The invention claimed is:

1. A molding element of a mold for molding and vulcanizing a tire tread, this tread comprising
   a tread surface intended to come into contact with the ground when the said tire is rolling,
   this molding element comprising
   a molding surface adapted to mold part of the tire tread surface and
   a blade adapted to mold a sipe or a groove in the tread,
   wherein the molding element comprises two cutting means positioned on either side of the blade at a certain distance from this blade, these cutting means comprising a plurality of pins.

2. The molding element according to claim 1, wherein the pins are aligned in a row along a direction of extension X, these pins comprising a body and a lamella on the top of this body, this lamella being aligned to this direction of extension X.

3. The molding element according to claim 1, wherein all or parts of the pins comprises a sharp edge.

* * * * *